United States Patent
Hur et al.

(10) Patent No.: US 10,144,826 B2
(45) Date of Patent: *Dec. 4, 2018

(54) IONIZING RADIATION RESISTANT POLYCARBONATE RESIN COMPOSITION AND ARTICLE COMPRISING THE SAME

(71) Applicant: Lotte Advanced Materials Co., Ltd., Yeosu-si (KR)

(72) Inventors: Jong Chan Hur, Uiwang (KR); Hyun Hye Jang, Uiwang-si (KR); O Sung Kwon, Uiwang-si (KR); Jun Ho Chi, Uiwang-si (KR); Woo Suk Chei, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 50 days.

This patent is subject to a terminal disclaimer.

(21) Appl. No.: 15/078,219

(22) Filed: Mar. 23, 2016

(65) Prior Publication Data

US 2016/0297964 A1 Oct. 13, 2016

(30) Foreign Application Priority Data

Apr. 13, 2015 (KR) .................. 10-2015-0052028
Feb. 16, 2016 (KR) .................. 10-2016-0018067

(51) Int. Cl.
| | | |
|---|---|---|
| *C08L 69/00* | (2006.01) | |
| *C08K 5/00* | (2006.01) | |
| *C08L 71/02* | (2006.01) | |
| *C08K 5/1515* | (2006.01) | |

(52) U.S. Cl.
CPC ............ *C08L 69/00* (2013.01); *C08K 5/0041* (2013.01); *C08K 5/1515* (2013.01); *C08L 71/02* (2013.01)

(58) Field of Classification Search
CPC ....... C08L 69/00; C08L 71/02; C08K 5/0041; C08K 5/1515
USPC .................................. 523/400, 461
See application file for complete search history.

(56) References Cited

U.S. PATENT DOCUMENTS

| | | |
|---|---|---|
| 3,260,760 A | 7/1966 | Domen et al. |
| 3,475,373 A | 10/1969 | Jackson, Jr. et al. |
| 3,489,716 A | 1/1970 | Calkins |
| 3,978,020 A | 8/1976 | Liberti |
| 4,066,611 A | 1/1978 | Axelrod |
| 4,092,288 A | 5/1978 | Calkins et al. |
| 4,760,107 A | 7/1988 | Nelson |
| 4,847,312 A | 7/1989 | Lundy et al. |
| 4,894,401 A | 1/1990 | Nelson |
| 5,274,009 A | 12/1993 | Grigo et al. |
| 5,382,605 A | 1/1995 | Powell et al. |
| 5,464,893 A | 11/1995 | Archey et al. |
| 5,612,398 A | 3/1997 | Fennhoff et al. |
| 5,684,062 A | 11/1997 | Ebert et al. |
| 5,773,491 A | 6/1998 | Ebert et al. |
| 5,948,838 A | 9/1999 | Miya et al. |
| 6,040,367 A | 3/2000 | Miya et al. |
| 7,297,380 B2 | 11/2007 | Coenjarts et al. |
| 7,511,114 B2 | 3/2009 | Miyamoto et al. |
| 7,649,039 B2 | 1/2010 | Glasgow et al. |
| 9,758,670 B2 | 9/2017 | Van Zyl et al. |
| 2003/0083405 A1 | 5/2003 | Wang et al. |
| 2005/0014878 A1 | 1/2005 | Schottland et al. |
| 2007/0100021 A1 | 5/2007 | Glasgow et al. |
| 2007/0100038 A1 | 5/2007 | Glasgow et al. |
| 2007/0117957 A1 | 5/2007 | Mullen |
| 2008/0081895 A1 | 4/2008 | Lens et al. |

FOREIGN PATENT DOCUMENTS

| | | |
|---|---|---|
| CN | 1980998 A | 6/2007 |
| CN | 101317106 A | 12/2008 |
| EP | 0535464 A2 | 4/1993 |
| EP | 0572889 A1 | 12/1993 |
| EP | 0611797 A1 | 8/1994 |
| EP | 0664321 A1 | 7/1995 |
| EP | 0732365 A1 | 9/1996 |
| EP | 0742260 A1 | 11/1996 |
| EP | 0794218 A1 | 9/1997 |
| EP | 1951802 B1 | 7/2010 |
| JP | 63-213553 | 9/1988 |
| JP | 04-011653 | 1/1992 |
| JP | 05-117516 A | 5/1993 |
| JP | 08-120171 | 5/1996 |
| JP | 09-059504 A | 3/1997 |
| JP | 09-087506 A | 3/1997 |
| JP | 2010-138263 A | 6/2010 |
| JP | 2012-207230 A | 10/2012 |

(Continued)

OTHER PUBLICATIONS

Final Office Action in commonly owned U.S. Appl. No. 14/943,542 dated May 16, 2017, pp. 1-22.
EPO Machine translated English language equivalent of JP 04-11653 (1992, 6 pages).
Office Action in counterpart Korean Application No. 10-2016-0018067 dated Aug. 14, 2017, pp. 1-5.
Office Action in commonly owned Korean Application No. 10-2014-0161214 dated Dec. 12, 2016, pp. 1-4.
Office Action in commonly owned U.S. Appl. No. 14/943,542 dated Nov. 23, 2016, pp. 1-18.

(Continued)

*Primary Examiner* — David T Karst
(74) *Attorney, Agent, or Firm* — Additon, Higgins & Pendleton, P.A.

(57) ABSTRACT

A polycarbonate resin composition includes: a polycarbonate resin; a polyalkylene glycol compound; and an organic-inorganic hybrid pigment, and has a yellow index (YI) of about −2 to about 4 after irradiation with gamma rays, as measured in accordance with ASTM D1925 after irradiating an about 3 mm thick specimen with gamma rays at about 25 kGy and leaving the specimen for 7 days. The polycarbonate resin composition can exhibit excellent properties in terms of color and impact resistance after being irradiated with ionizing radiation.

9 Claims, No Drawings

(56) References Cited

FOREIGN PATENT DOCUMENTS

| KR | 10-2008-0081905 A | 9/2008 |
| KR | 10-2012-0077665 A | 7/2012 |
| KR | 10-2015-0037741 A | 4/2015 |

OTHER PUBLICATIONS

Office Action in commonly owned Chinese Application No. 201510794558.6 dated Mar. 13, 2017, pp. 1-6.
Machine translated English language equivalent of JP 08-120171 (May 1996, 4 pages).
Derwent Abstract of JP 63-213553 (Acc. No. 1998-176590, 1993, 3 pages).
Non-Final Office Action in commonly owned U.S. Appl. No. 14/943,542 dated Feb. 21, 2018, pp. 1-22.
Office Action in commonly owned Korean Application No. 10-2016-0064374 dated Jan. 4, 2018, pp. 1-5.
Office Action in commonly owned U.S. Appl. No. 15/195,058 dated Jan. 17, 2018, pp. 1-29.
Office Action in commonly owned Chinese Application No. 201610499400.0 dated Nov. 3, 2017, pp. 1-7.
English-translation of Office Action in commonly owned Chinese Application No. 201620499400.0 dated Nov. 3, 2017, pp. 1-9.
Final Office Action in commonly owned U.S. Appl. No. 15/195,058 dated May 2, 2018, pp. 1-14.
Office Action in commonly owned German Application No. 102016112050.2 dated May 9, 2018, pp. 1-5.

IONIZING RADIATION RESISTANT POLYCARBONATE RESIN COMPOSITION AND ARTICLE COMPRISING THE SAME

CROSS-REFERENCE TO RELATED APPLICATION

This application claims priority under 35 USC Section 119 to and the benefit of Korean Patent Application 10-2015-0052028, filed Apr. 13, 2015, and Korean Patent Application 10-2016-0018067, filed Feb. 16, 2016, the entire disclosure of each of which is incorporated herein by reference.

FIELD

The present invention relates to an ionizing radiation resistant polycarbonate resin composition and a molded article including the same.

BACKGROUND

Polycarbonate resins have good mechanical and thermal properties and are thus used in a variety of applications. For example, polycarbonate resins can exhibit excellent transparency, hygiene, stiffness, and heat resistance and are thus widely used as a material for medical supplies such as medical devices, surgical instruments, and surgical appliances.

Such medical supplies require sterilization. Sterilization methods include contact treatment using sterilization gases such as ethylene oxide, heat treatment in an autoclave, and irradiation treatment using ionizing radiation such as gamma rays, electron beams, and X-rays.

Ethylene oxide used in contact treatment, however, is toxic and not stable and thus there can be environmental problems with the disposal thereof. Heat treatment in an autoclave can cause degradation of a resin during high temperature treatment and requires high energy costs and a drying process for removing residual moisture from treated components. Thus, irradiation treatment using ionizing radiation, which allows treatment at low temperature and is relatively economical, is generally used for sterilization.

Generally, polycarbonate resins suffer from yellowing and deterioration in physical properties when irradiated with ionizing radiation. To overcome these problems, there have been proposed a method of blending a polycarbonate resin with other polymers, a method of adding various additives to a polycarbonate resin, and a method of copolymerizing a polycarbonate resin. See, for example, Korean Patent Publication No. 10-2012-0077665.

However, such methods have failed to completely solve problems such as yellowing and deterioration in physical properties.

Therefore, there is a need for a polycarbonate resin composition which exhibits excellent properties in terms of color and impact resistance after being irradiated with ionizing radiation so that liquid level or color of contents such as chemicals or blood in a molded article can be easily distinguished.

SUMMARY OF THE INVENTION

Embodiments provide a polycarbonate resin composition which can exhibit excellent properties in terms of color and impact resistance after being irradiated with ionizing radiation, and a molded article including the same.

In exemplary embodiments, the polycarbonate resin composition includes: a polycarbonate resin; a polyalkylene glycol compound; and an organic-inorganic hybrid pigment, and has a yellow index (YI) of about −2 to about 4 after irradiation with gamma rays, as measured in accordance with ASTM D1925 after irradiating an about 3 mm thick specimen with gamma rays at about 25 kGy and leaving the specimen for 7 days.

In exemplary embodiments, the organic-inorganic hybrid pigment may include at least one of a phthalocyanine compound and an azo compound.

In exemplary embodiments, the phthalocyanine compound may include a compound represented by Formula 1:

[Formula 1]

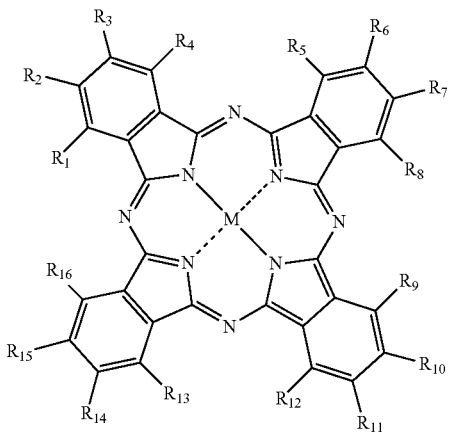

wherein, M is copper, iron, nickel, cobalt, manganese, aluminum, palladium, tin, lead, titanium, rubidium, terbium, cerium, lanthanum, or zinc; and $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$ and $R_{16}$ are the same or different and are each independently a hydrogen atom, a halogen atom, or a $C_1$ to $C_{10}$ hydrocarbon group.

In exemplary embodiments, the azo compound may be an azo lake pigment.

In exemplary embodiments, the polyalkylene glycol compound may be present in an amount of about 0.6 parts by weight to about 5 parts by weight, and the organic-inorganic hybrid pigment may be present in an amount of about 0.0001 parts by weight to about 0.05 parts by weight, based on about 100 parts by weight of the polycarbonate resin.

In exemplary embodiments, the polycarbonate resin composition may further include: an epoxy ester compound represented by Formula 2:

[Formula 2]

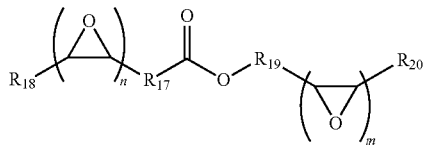

wherein, $R_{17}$ and $R_{19}$ are the same or different and are each independently a $C_1$ to $C_{10}$ hydrocarbon group, $R_{18}$ and $R_{20}$ are the same or different and are each independently a hydrogen atom or a $C_1$ to $C_{10}$ hydrocarbon group, m and n are the same or different and are each independently 0 or 1, and m+n is 1 or 2. $R_{17}$ and $R_{18}$, and $R_{19}$ and $R_{20}$, respectively, are connected to one another to form a ring.

In exemplary embodiments, the epoxy ester compound may be present in an amount of about 0.001 to about 3 parts by weight, based on about 100 parts by weight of the polycarbonate resin.

In exemplary embodiments, the polycarbonate resin composition may have a lightness (L*) of about 80 or higher after irradiation with gamma rays, as measured in accordance with ASTM D2244 after irradiating an about 3 mm thick specimen with gamma rays at about 25 kGy and leaving the specimen for about 7 days, and may have a transmittance of about 80% or higher after irradiation with gamma rays, as measured in accordance with ASTM D1003 after irradiating an about 3 mm thick specimen with gamma rays at about 25 kGy and leaving the specimen for about 7 days.

In exemplary embodiments, the polycarbonate resin composition may have an Izod impact strength of about 70 kgf·cm/cm to about 90 kgf·cm/cm after irradiation with gamma rays, as measured in accordance with ASTM D256 after irradiating an about 3.2 mm thick Izod specimen with gamma rays at about 25 kGy and leaving the specimen for about 7 days.

Other embodiments relate to a molded article formed of the polycarbonate resin composition as set forth above.

In exemplary embodiments, the molded article may be an ionizing radiation resistant medical supply article.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A polycarbonate resin composition according to the present invention can have ionizing radiation resistance and includes: a polycarbonate resin; a polyalkylene glycol compound; and an organic-inorganic hybrid pigment, wherein the polycarbonate resin composition has a yellow index (YI) of about −2 to about 4 after irradiation with gamma rays, as measured in accordance with ASTM D1925 after irradiating an about 3 mm thick specimen with gamma rays at about 25 kGy and leaving the specimen for 7 days.

The polycarbonate resin may include any suitable polycarbonate resin such as an aromatic polycarbonate resin used in a typical polycarbonate resin composition. For example, the polycarbonate resin may be prepared by a typical method, for example, by reacting a dihydric phenol compound with phosgene in the presence of a molecular weight regulator and a catalyst, or through transesterification of a dihydric phenol compound and a carbonate precursor such as diphenyl carbonate.

In preparation of the polycarbonate resin, the dihydric phenol compound may be a bisphenol compound, for example, 2,2-bis(4-hydroxyphenyl)propane (hereinafter, "bisphenol A"). Here, the bisphenol A may be partially or completely replaced by other dihydric phenol compounds. Examples of other dihydric phenol compounds may include without limitation hydroquinone, 4,4'-biphenol, bis(4-hydroxyphenyl)methane, 1,1-bis(4-hydroxyphenyl)cyclohexane, 2,2-bis(3,5-dimethyl-4-hydroxyphenyopropane, bis (4-hydroxyphenyl)sulfide, bis(4-hydroxyphenyl)sulfone, bis (4-hydroxyphenyl)sulfoxide, bis(4-hydroxyphenyl)ketone, halogenated bisphenol, such as bis(4-hydroxyphenyl)ether or 2,2-bis(3,5-dibromo-4-hydroxyphenyl)propane, and the like, and mixtures thereof. However, the dihydric phenol compound which can be used for preparation of the polycarbonate resin is not limited thereto, and the polycarbonate resin may be prepared using any dihydric phenol compound.

In addition, the polycarbonate resin may include a homopolymer using one dihydric phenol compound, a copolymer using at least two dihydric phenol compounds, or a mixture thereof.

Generally, a polycarbonate resin may be a linear polycarbonate resin, a branched polycarbonate resin, a polyester carbonate copolymer resin, and the like. The polycarbonate resin included in the polycarbonate resin composition is not particularly limited and may include such linear polycarbonate resins, branched polycarbonate resins, and/or polyester carbonate copolymer resins.

For example, the linear polycarbonate resin may be a bisphenol A polycarbonate resin, and the branched polycarbonate resin may be prepared by, for example, reacting a polyfunctional aromatic compound such as trimellitic anhydride or trimellitic acid with a dihydric phenol compound and a carbonate precursor. The polyester carbonate copolymer resin may be prepared by, for example, reacting a bifunctional carboxylic acid with dihydric phenol and a carbonate precursor. In addition, the polycarbonate resin may include typical linear polycarbonate resins, branched polycarbonate resins, and/or polyester carbonate copolymer resins without limitation.

In some embodiments, the polycarbonate resin may include a terminal modified polycarbonate resin having a tert-butylphenoxy group at a terminal thereof. The terminal modified polycarbonate resin may be prepared by a typical method for preparing a polycarbonate resin except that tert-butylphenol is added during the preparation of a polycarbonate resin. When the terminal modified polycarbonate resin is included in the composition, the tert-butylphenoxy group may be present in an amount of about 0.1 mol % to about 80 mol %, for example, about 20 mol % to about 60 mol %, in the polycarbonate resin. Within this range, the polycarbonate resin composition can exhibit further enhanced properties in terms of ionizing radiation resistance, impact resistance, and the like.

In exemplary embodiments, the polycarbonate resin may have a weight average molecular weight (Mw) of about 10,000 g/mol to about 200,000 g/mol, for example, about 15,000 g/mol to about 80,000 g/mol, as measured by gel permeation chromatography (GPC), without being limited thereto.

In addition, the polycarbonate resin may have a melt flow index (MI) of about 3 g/10 min to about 35 g/10 min, as measured in accordance with ISO 1133 (at about 350° C. under a load of about 1.2 kg), without being limited thereto.

The polyalkylene glycol compound may include polyalkylene glycol, ethers of polyalkylene glycol, and/or esters of polyalkylene glycol. The polyalkylene glycol compound may include any polyols used in a typical ionizing radiation resistant composition. Examples of the polyalkylene glycol compound may include polyethylene glycol, polyethylene glycol methyl ether, polyethylene glycol dimethyl ether, polyethylene glycol dodecyl ether, polyethylene glycol benzyl ether, polyethylene glycol dibenzyl ether, polyethylene glycol-4-nonylphenyl ether, polypropylene glycol, polypropylene glycol methyl ether, polypropylene glycol dimethyl ether, polypropylene glycol dodecyl ether, polypropylene glycol benzyl ether, polypropylene glycol dibenzyl ether, polypropylene glycol-4-nonylphenyl ether, polytetramethylene glycol, polyethylene glycol diacetate ester, polyethylene glycol acetate propionate ester, polyethylene glycol dibutyrate ester, polyethylene glycol distearate ester, polyethylene glycol dibenzoate ester, polyethylene glycol di-2,6-dimethyl benzoate ester, polyethylene glycol di-p-tert-butyl benzoate ester, polyethylene glycol dicaprylate ester, polypropylene glycol diacetate ester, polypropylene glycol acetate propionate ester, polypropylene glycol dibutyrate ester, polypropylene glycol distearate ester, polypropylene glycol dibenzoate ester, polypropylene glycol di-2,6-dimethyl benzoate ester, polypropylene glycol di-p-tert-butyl benzoate ester, polypropylene glycol dicaprylate ester, and the like, without being limited thereto. These may be used alone or as a mixture thereof.

In exemplary embodiments, the polyalkylene glycol compound may have a number average molecular weight (Mn) of about 1,000 g/mol to about 5,000 g/mol, for example, about 1,500 g/mol to about 3,000 g/mol, as measured by gel permeation chromatography (GPC), without being limited thereto.

In exemplary embodiments, polycarbonate resin composition can include the polyalkylene glycol compound in an amount of about 0.6 parts by weight to about 5 parts by weight, for example, about 0.9 parts by weight to about 3 parts by weight, based on about 100 parts by weight of the polycarbonate resin. In some embodiments, the polycarbonate resin composition can include the polyalkylene glycol compound in an amount of about 0.6, 0.7, 0.8, 0.9, 1, 2, 3, 4, or 5 parts by weight. Further, according to some embodiments, the amount of the polyalkylene glycol compound can be in a range from about any of the foregoing amounts to about any other of the foregoing amounts.

Within this range, the polycarbonate resin composition can exhibit excellent properties in terms of color, impact resistance, and the like after being irradiated with ionizing radiation.

The organic-inorganic hybrid pigment can suppress yellowing and may include, without limitation, phthalocyanine compounds, azo compounds, and the like, and mixtures thereof.

In exemplary embodiments, the phthalocyanine compound may include a compound represented by Formula 1.

[Formula 1]

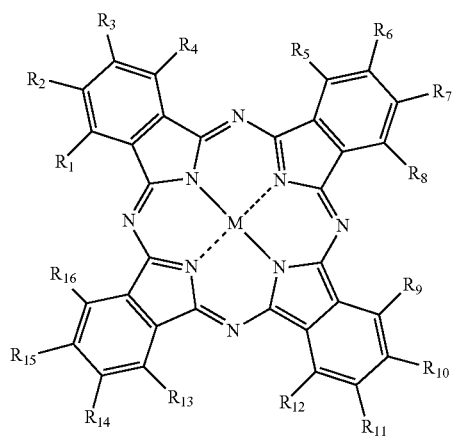

In Formula 1, M is copper, iron, nickel, cobalt, manganese, aluminum, palladium, tin, lead, titanium, rubidium, terbium, cerium, lanthanum, or zinc; and $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$ and $R_{16}$ are the same or different and are each independently a hydrogen atom, a halogen atom, or a $C_1$ to $C_{10}$ hydrocarbon group.

As used herein, the term $C_1$ to $C_{10}$ hydrocarbon group refers to substituted or unsubstituted $C_1$ to $C_{10}$ alkyl group, $C_3$ to $C_{10}$ cycloalkyl group, $C_5$ to $C_{10}$ aryl group, $C_1$ to $C_{10}$ alkylene group, $C_3$ to $C_{10}$ cycloalkylene group, and/or $C_5$ to $C_{10}$ arylene group. Also as used herein, the term "substituted" refers to one or more hydrogen atoms substituted with a substituent such as a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, or a combination thereof, and the term "hetero" refers to one or more of N, S, O and/or P atoms in place of a hydrogen atom.

Examples of the phthalocyanine compound may include a compound (Pigment Green 7) represented by Formula 1a, a compound (Pigment Blue 15:3) represented by Formula 1b, and/or Pigment Green 36, without being limited thereto.

[Formula 1a]

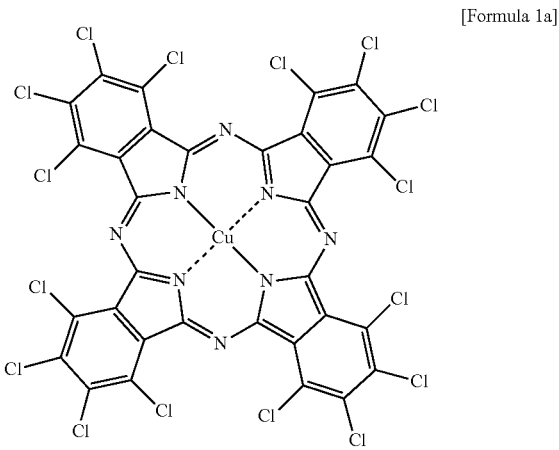

[Formula 1b]

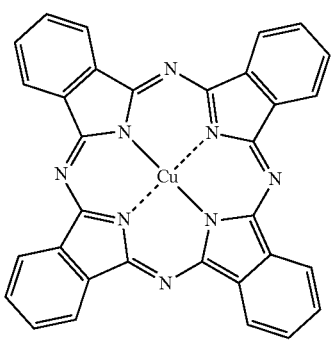

In exemplary embodiments, the phthalocyanine compound may be a mixture of a first phthalocyanine compound in which each of $R_1$ to $R_{16}$ of Formula 1 is not a hydrogen atom and a second phthalocyanine compound in which each of $R_1$ to $R_{16}$ of Formula 1 is a hydrogen atom. When the organic-inorganic hybrid pigment is a mixture of the first phthalocyanine compound and the second phthalocyanine compound, a weight ratio of the to first phthalocyanine compound to the second phthalocyanine compound may range from about 1:0.25 to about 1:4, for example, about 1:0.5 to about 1:2, without being limited thereto.

In exemplary embodiments, the azo compound may be an azo lake pigment. For example, the azo compound may include Pigment Red 48:2, Pigment Red 48:3, and/or Pigment Red 57:1, without being limited thereto.

In exemplary embodiments, the polycarbonate resin composition can include the organic-inorganic hybrid pigment in an amount of about 0.0001 parts by weight to about 0.05 parts by weight, for example, about 0.001 parts by weight to about 0.01 parts by weight, based on about 100 parts by weight of the polycarbonate resin. In some embodiments, the polycarbonate resin composition can include the organic-inorganic hybrid pigment in an amount of about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, or 0.05 parts by weight. Further, according to some embodiments, the amount of the organic-inorganic hybrid pigment can be in a range from about any of the foregoing amounts to about any other of the foregoing amounts.

Within this range, the polycarbonate resin composition can exhibit excellent properties in terms of color, impact resistance, and the like after being irradiated with ionizing radiation.

The polycarbonate resin composition according to one embodiment of the present invention may further include an epoxy ester compound including an ester group and an epoxy group, an allyl ether compound, or a combination thereof.

In exemplary embodiments, the epoxy ester compound can enhance ionizing radiation resistance with minimal or no deterioration in hydrolysis resistance and may include, for example, a compound represented by Formula 2.

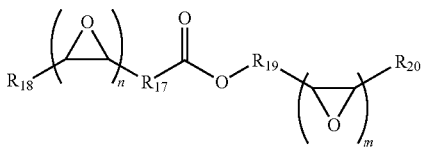
[Formula 2]

In Formula 2, $R_{17}$ and $R_{19}$ are the same or different and are each independently a $C_1$ to $C_{10}$ hydrocarbon group, $R_{18}$ and $R_{20}$ are the same or different and are each independently a hydrogen atom or a $C_1$ to $C_{10}$ hydrocarbon group, m and n are the same or different and are each independently 0 or 1, and m+n is 1 or 2. Here, $R_{17}$ and $R_{18}$; and $R_{19}$ and $R_{20}$, respectively, are connected to one another to form a ring.

Examples of the epoxy ester compound may include compounds represented by Formulas 2a to 2c, without being limited thereto.

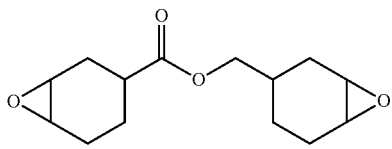
[Formula 2a]

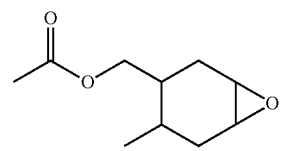
[Formula 2b]

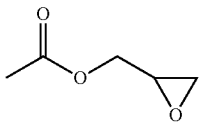
[Formula 2c]

In exemplary embodiments, when the epoxy ester compound is used, the polycarbonate resin composition can include the epoxy ester compound in an amount of about 0.001 parts by weight to about 3 parts by weight, for example, about 0.01 parts by weight to about 2 parts by weight, based on about 100 parts by weight of the polycarbonate resin. In some embodiments, the polycarbonate resin composition can include the epoxy ester compound in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, or 3 parts by weight. Further, according to some embodiments, the amount of the epoxy ester compound can be in a range from about any of the foregoing amounts to about any other of the foregoing amounts.

Within this range, the polycarbonate resin composition can exhibit excellent properties in terms of color, impact resistance, and the like after being irradiated with ionizing radiation.

In addition, a weight ratio of the organic-inorganic hybrid pigment to the epoxy ester compound may range from about 1:5 to about 1:100, for example, about 1:8 to about 1:40. Within this range, the polycarbonate resin composition can exhibit excellent properties in terms of color, impact resistance, and the like after being irradiated with ionizing radiation.

In exemplary embodiments, the allyl ether compound may include trimethylolpropane diallyl ether, pentaerythritol diallyl ether, glycerin diallyl ether, and the like, mixtures thereof, without being limited thereto.

In exemplary embodiments, when the allyl ether compound is used, the polycarbonate resin composition can include the allyl ether compound in an amount of about 0.001 parts by weight to about 3 parts by weight, for example, about 0.01 parts by weight to about 2 parts by weight, based on about 100 parts by weight of the polycarbonate resin. In some embodiments, the polycarbonate resin composition can include the allyl ether compound in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, or 3 parts by weight. Further, according to some embodiments, the amount of the allyl ether compound can be in a range from about any of the foregoing amounts to about any other of the foregoing amounts.

Within this range, the polycarbonate resin composition can exhibit further enhanced properties in terms of color and the like after being irradiated with ionizing radiation.

The polycarbonate resin composition according to exemplary embodiments may further include one or more other resins without altering advantageous effects of the present invention. For example, the polycarbonate resin composition may further include polyethylene terephthalate, polybutylene terephthalate, and/or polyester polycarbonate, without being limited thereto. When other resins are used, such other resins may be present in an amount of about 50 parts by weight or less, for example, about 1 to about 15 parts by weight, based on about 100 parts by weight of the polycarbonate resin, without being limited thereto. In some embodiments, the polycarbonate resin composition can include the other resin in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments, the amount of the other resin can be in a range from about any of the foregoing amounts to about any other of the foregoing amounts.

The polycarbonate resin composition according to exemplary embodiments may further include one or more of any suitable additives generally used in a resin composition. Examples of the additives may include fillers, reinforcing agents, stabilizers, colorants, antioxidants, antistatic agents, flow enhancers, release agents, and/or nucleating agents, without being limited thereto. When the additives are used, the additives may be present in an amount of about 25 parts by weight or less, for example, about 10 parts by weight or less, based on about 100 parts by weight of the polycarbonate resin, without being limited thereto.

The polycarbonate resin composition may be prepared by any known method for preparing a thermoplastic resin composition. For example, the polycarbonate resin composition may be prepared in pellet form by mixing the above components and optionally other additives by a typical method, followed by melt extrusion using an extruder or the like. The prepared pellets may be formed into various molded articles through various molding methods, such as injection molding, extrusion molding, vacuum molding, cast molding, and the like.

The polycarbonate resin composition may have a yellow index (YI) of about −2 to about 4 after irradiation with gamma rays, for example, about −1 to about 1, and as another example about 0 to about 0.5, as measured in accordance with ASTM D1925 after irradiating an about 3 mm thick specimen with gamma rays at about 25 kGy and leaving the specimen for about 7 days. If the yellow index (YI) after irradiation with gamma rays is higher than about 4, a molded article can suffer from yellowing making it difficult to distinguish liquid level or color of contents such as chemicals and blood in the molded article and exhibit poor appearance characteristics, whereas, if the yellow index (YI) after irradiation with gamma rays is less than −2, contents such as chemicals and blood are likely to appear blue.

In exemplary embodiments, the polycarbonate resin composition may have a lightness (L*) of about 80 or higher after irradiation with gamma rays, for example, about 80 to about 95, as measured in accordance with ASTM D2244 after irradiating an about 3 mm thick specimen with gamma rays at about 25 kGy and leaving the specimen for about 7 days. Within this range of lightness, liquid level or color of contents such as chemicals and blood in the molded article can be easily distinguished.

In exemplary embodiments, the polycarbonate resin composition may have a transmittance of about 80% or higher after irradiation with gamma rays, for example, about 80% to about 95%, as measured in accordance with ASTM D1003 after irradiating an about 3 mm thick specimen with gamma rays at about 25 kGy and leaving the specimen for about 7 days. Within this range of transmittance, liquid level or color of contents such as chemicals and blood in the molded article can be easily distinguished.

In exemplary embodiments, the polycarbonate resin composition may have an Izod impact strength of about 70 kgf·cm/cm to about 90 kgf·cm/cm after irradiation with gamma rays, for example, about 75 kgf·cm/cm to about 85 kgf·cm/cm, as measured in accordance with ASTM D256 after irradiating an about 3.2 mm thick Izod specimen with gamma rays at about 25 kGy and leaving the specimen for about 7 days.

A molded article according to the present invention may be fabricated (formed) from the ionizing radiation resistant polycarbonate resin composition as set forth above by any known molding method. The molded article can have excellent properties in terms of color, impact resistance, and the like after being irradiated with ionizing radiation and thus may be used in ionizing radiation resistant medical supplies such as but not limited to: container shaped packaging means for receiving or packaging syringes, surgical instruments, intravenous injectors, and surgical appliances; components of medical apparatuses, such as artificial lungs, artificial kidneys, anesthesia inhalers, intravenous connectors, hemodialyzers, hemofilters, safety syringes, and accessories thereof; and components of blood centrifuges, surgical instruments, surgical appliances, and intravenous injectors.

Next, the present invention will be described in more detail with reference to the following examples. It should be understood that these examples are provided for illustration only and are not to be in any way construed as limiting the present invention.

In addition, descriptions of details apparent to those skilled in the art will be omitted for clarity.

EXAMPLES

Details of a polycarbonate resin, a polyalkylene glycol compound, an organic-inorganic hybrid pigment, and an epoxy ester compound used in the following Examples and Comparative Examples are as follows:

(A) Polycarbonate Resin

Bisphenol A-type polycarbonate resin (SC-1080, Samsung SDI, weight average molecular weight (Mw): 28,000 g/mol, melt flow index (MI): 8 g/10 min (at 300° C. under a load of 1.2 kg)) is used.

(B) Polyalkylene Glycol Compound

Polypropylene glycol (number average molecular weight (Mn): 2,000 g/mol) is used.

(C) Organic-Inorganic Hybrid Pigment (C1) A compound represented by Formula 1a is used.

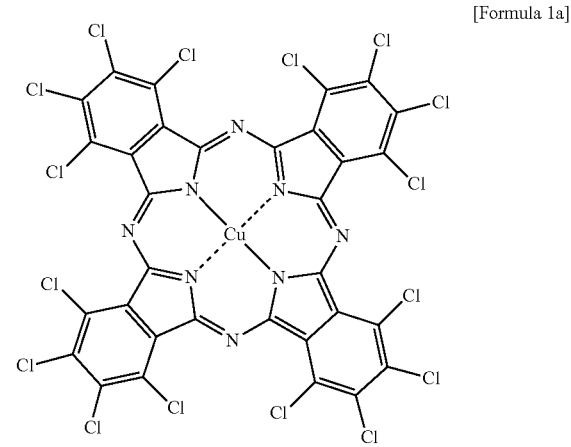

[Formula 1a]

(C2) A compound represented by Formula 1b is used.

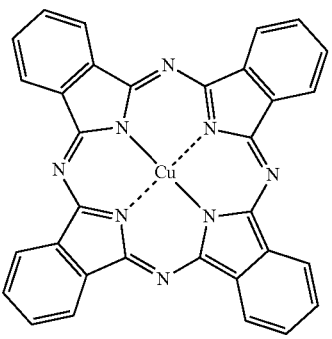

[Formula 1b]

(D) Organic Pigment
(D1) M-BLUE-2R available from Bayer AG is used.
(D2) M-Violet-3R available from Bayer AG is used.
(E) Epoxy Ester Compound
A compound represented by Formula 2a is used.

[Formula 2a]

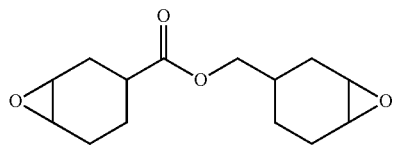

ditions of a molding temperature of 310° C. and a mold temperature of 65° C., thereby preparing a specimen. The prepared specimen is evaluated as to the following properties, and results are shown in Table 1.

Property Evaluation (1) Yellow index (YI) after irradiation with gamma rays: Yellow index is measured on a 3 mm thick specimen in accordance with ASTM D1925 after irradiating the specimen with gamma rays at 25 kGy and leaving the specimen for 7 days.

(2) Lightness (L*) after irradiation with gamma rays: Lightness is measured on a 3 mm thick specimen in accordance with ASTM D2244 after irradiating the specimen with gamma rays at 25 kGy and leaving the specimen for 7 days.

(3) Transmittance after irradiation with gamma rays (unit: %): Transmittance is measured on a 3 mm thick specimen in accordance with ASTM D1003 after irradiating the specimen with gamma rays at 25 kGy and leaving the specimen for 7 days.

(4) Izod impact strength after irradiation with gamma rays (unit: kgf·cm/cm): Izod impact strength is measured on a 3.2 mm thick Izod specimen in accordance with ASTM D256 after irradiating the specimen with gamma rays at 25 kGy and leaving the specimen for 7 days.

TABLE 1

| | | Example | | | | | | |
|---|---|---|---|---|---|---|---|---|
| | | 1 | 2 | 3 | 4 | 5 | 6 | 7 |
| (A) (parts by weight) | | 100 | 100 | 100 | 100 | 100 | 100 | 100 |
| (B) (parts by weight) | | 0.9 | 0.9 | 0.9 | 1.2 | 0.9 | 0.9 | 0.9 |
| (C) (parts by weight) | (C1) | 0.001 | — | 0.005 | 0.005 | 0.001 | 0.001 | — |
| | (C2) | — | 0.001 | 0.005 | 0.005 | — | — | 0.001 |
| (D) (parts by weight) | (D1) | — | — | — | — | — | — | — |
| | (D2) | — | — | — | — | — | — | — |
| (E) (parts by weight) | | — | — | — | — | 0.03 | 0.04 | 0.04 |
| YI after irradiation with gamma rays | | 0.3 | 0.2 | 0.2 | 0.0 | 0.1 | 0.1 | 0.1 |
| L* after irradiation with gamma rays | | 85 | 85 | 84 | 84 | 85 | 85 | 85 |
| Transmittance after irradiation with gamma rays (%) | | 80.8 | 81.2 | 80.9 | 80.9 | 81.0 | 81.3 | 81.3 |
| Izod impact strength after irradiation with gamma rays (kgf·cm/cm) | | 78 | 77 | 78 | 77 | 77 | 77 | 77 |

Examples 1 to 7 and Comparative Examples 1 to 3

Preparation of Polycarbonate Resin Composition

According to compositions and amounts as listed in Tables 1 and 2, (A) a polycarbonate resin, (B) a polyalkylene glycol compound, (C) an organic-inorganic hybrid pigment, (D) an organic pigment, and (E) an epoxy ester compound are mixed, followed by extrusion using a twin-screw type extruder (L/D=36, Φ=32 mm) at 270° C. and preparation of a polycarbonate resin composition in pellet form using a pelletizer. The polycarbonate resin composition prepared in pellet form is dried in an oven at 120° C. for 4 hours, followed by injection molding using an injection machine (DHC 120WD, Dongshin Hydraulics Co., Ltd.) under con-

TABLE 2

| | | Comparative Example | | |
|---|---|---|---|---|
| | | 1 | 2 | 3 |
| (A) (parts by weight) | | 100 | 100 | 100 |
| (B) (parts by weight) | | 0.9 | 0.9 | 0.9 |
| (C) (parts by weight) | (C1) | — | — | — |
| | (C2) | — | — | — |
| (D) (parts by weight) | (D1) | — | 0.001 | — |
| | (D2) | — | — | 0.001 |
| (E) (parts by weight) | | — | — | — |
| YI after irradiation with gamma rays | | 20.2 | 5.5 | 4.6 |
| L* after irradiation with gamma rays | | 78 | 81 | 82 |
| Transmittance after irradiation with gamma rays (%) | | 74.5 | 76.5 | 77.2 |

TABLE 2-continued

|  | Comparative Example | | |
|---|---|---|---|
|  | 1 | 2 | 3 |
| Izod impact strength after irradiation with gamma rays (kgf · cm/cm) | 74 | 75 | 76 |

From Tables 1 and 2, it can be seen that the polycarbonate resin composition according to the present invention exhibits excellent properties in terms of color (YI, L*, and transmittance) and impact resistance after being irradiated with ionizing radiation.

Conversely, it can be seen that the polycarbonate resin compositions of the Comparative Examples not including the organic-inorganic hybrid pigment (C) according to the present invention have relatively poor properties in terms of color and impact resistance after being irradiated with ionizing radiation, as compared with those of Examples. Particularly, it can be seen that the specimens prepared in the Comparative Examples suffer from severe yellowing.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:

1. A polycarbonate resin composition comprising:
a polycarbonate resin;
about 0.6 parts by weight to about 5 parts by weight of a polyalkylene glycol compound; and
about 0.0001 parts by weight to about 0.05 parts by weight of an organic-inorganic hybrid pigment comprising at least one of a phthalocyanine compound and an azo compound, each based on about 100 parts by weight of the polycarbonate resin,
wherein the polycarbonate resin composition has a yellow index (YI) of about −1 to about 1 after irradiation with gamma rays, as measured in accordance with ASTM D1925-70(1988) after irradiating an about 3 mm thick specimen with gamma rays at about 25 kGy and leaving the specimen for 7 days.

2. The polycarbonate resin composition according to claim 1, wherein the organic-inorganic hybrid pigment comprises a phthalocyanine and wherein the phthalocyanine compound comprises a compound represented by Formula 1:

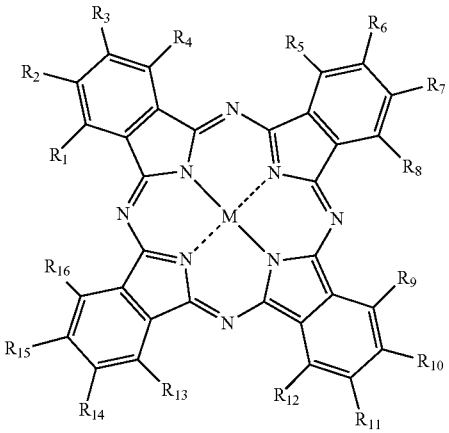

[Formula 1]

wherein, M is copper, iron, nickel, cobalt, manganese, aluminum, palladium, tin, lead, titanium, rubidium, terbium, cerium, lanthanum, or zinc; and $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$ and $R_{16}$ are the same or different and are each independently a hydrogen atom, a halogen atom, or a $C_1$ to $C_{10}$ hydrocarbon group.

3. The polycarbonate resin composition according to claim 1, wherein the azo compound is an azo lake pigment.

4. The polycarbonate resin composition according to claim 1, further comprising:
an epoxy ester compound represented by Formula 2:

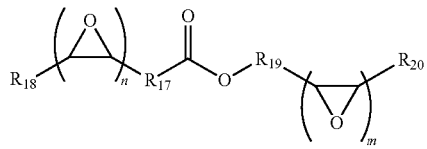

[Formula 2]

wherein, $R_{17}$ and $R_{19}$ are the same or different and are each independently a $C_1$ to $C_{10}$ hydrocarbon group; $R_{18}$ and $R_{20}$ are the same or different and are each independently a hydrogen atom or a $C_1$ to $C_{10}$ hydrocarbon group; m and n are the same or different and are each independently 0 or 1; and m+n is 1 or 2, and wherein $R_{17}$ and $R_{18}$ are connected to one another to form a ring and $R_{19}$ and $R_{20}$ are connected to one another to form a ring.

5. The polycarbonate resin composition according to claim 4, comprising the epoxy ester compound in an amount of about 0.001 to about 3 parts by weight, based on about 100 parts by weight of the polycarbonate resin.

6. The polycarbonate resin composition according to claim 1, wherein the polycarbonate resin composition has a lightness (L*) of about 80 or higher after irradiation with gamma rays, as measured in accordance with ASTM D2244-16 after irradiating an about 3 mm thick specimen with gamma rays at about 25 kGy and leaving the specimen for about 7 days, and has a transmittance of about 80% or higher after irradiation with gamma rays, as measured in accordance with ASTM D1003-13 after irradiating an about 3 mm thick specimen with gamma rays at about 25 kGy and leaving the specimen for about 7 days.

7. The polycarbonate resin composition according to claim 1, wherein the polycarbonate resin composition has an Izod impact strength of about 70 kgf·cm/cm to about 90 kgf·cm/cm after irradiation with gamma rays, as measured in accordance with ASTM D256-10e1 after irradiating an about 3.2 mm thick Izod specimen with gamma rays at about 25 kGy and leaving the specimen for about 7 days.

8. A molded article formed of the polycarbonate resin composition according to claim 1.

9. The molded article according to claim 8, wherein the molded article is an ionizing radiation resistant medical supply article.

* * * * *